US012515237B2

(12) United States Patent
Gurreri et al.

(10) Patent No.: US 12,515,237 B2
(45) Date of Patent: Jan. 6, 2026

(54) PAD PAINTER SYSTEM

(71) Applicant: SWIMC LLC, Cleveland, OH (US)

(72) Inventors: Christopher Nicholas Gurreri, Cleveland, OH (US); Jennifer S. Kitchen, Cleveland, OH (US); Michael C. Lambertson, Jr., Cleveland, OH (US); Connie M. McKinney, Cleveland, OH (US)

(73) Assignee: SWIMC LLC, Cleveland, OH (US)

( * ) Notice: Subject to any disclaimer, the term of this patent is extended or adjusted under 35 U.S.C. 154(b) by 519 days.

(21) Appl. No.: 17/699,530

(22) Filed: Mar. 21, 2022

(65) Prior Publication Data

US 2022/0203398 A1 Jun. 30, 2022

Related U.S. Application Data

(63) Continuation-in-part of application No. 29/762,494, filed on Dec. 16, 2020, now Pat. No. Des. 948,222.

(51) Int. Cl.
*B05C 17/10* (2006.01)
*B05C 1/06* (2006.01)

(52) U.S. Cl.
CPC ................ *B05C 17/10* (2013.01); *B05C 1/06* (2013.01)

(58) Field of Classification Search
CPC ........... B05C 17/00; B05C 17/10; B05C 1/06; A46B 1/00; A46B 2200/202; A46B 5/0095
See application file for complete search history.

(56) References Cited

U.S. PATENT DOCUMENTS 2,668,973 A * 2/1954 Glaza ....................... A46B 7/04 132/308
2,955,308 A 10/1960 Nelson
3,369,268 A * 2/1968 Burns ..................... B05C 17/00 15/210.1
3,389,418 A 6/1968 Sencabaugh
3,473,183 A * 10/1969 Burns et al. ............ B05C 17/00 403/111

(Continued)

FOREIGN PATENT DOCUMENTS

GB 6110030 12/2020

OTHER PUBLICATIONS

Search Report from corresponding GB Application No. 2304047.0 mailed on Sep. 21, 2023, 4 pages.

*Primary Examiner* — Dah-Wei D. Yuan
*Assistant Examiner* — Stephen A Kitt
(74) *Attorney, Agent, or Firm* — Tucker Ellis LLP

(57) ABSTRACT

A pad painter system includes a pad painter having a base portion and a handle portion extending from the base portion, an applicator pad detachably secured to the base portion, and a lock mechanism having a lock tab of the base portion and an tab opening of the applicator pad. The lock tab extends into the tab opening to retain the applicator pad to the pad painter. The lock tab is formed at an edge of a wall and an opening is formed in the wall adjacent to the lock tab so that the lock tab can be resiliently deflected out of the tab opening to release the applicator pad. The base portion can include a tab flange extending out from the wall that extends inwardly from the edge at opposed sides of the lock tab and around the lock tab to stiffen the wall area by the lock tab.

18 Claims, 15 Drawing Sheets

(56) References Cited

U.S. PATENT DOCUMENTS

| | | | | |
|---|---|---|---|---|
| D224,713 | S | 9/1972 | Schmitz et al. | |
| 4,224,713 | A * | 9/1980 | Trent | B05C 17/00 15/210.1 |
| 4,300,258 | A * | 11/1981 | Burns | A46B 5/02 15/210.1 |
| 5,774,925 | A | 7/1998 | Pryor, III | |
| 6,012,750 | A | 1/2000 | Swartz | |
| 7,076,826 | B2 | 7/2006 | Hochanandel | |
| 7,412,742 | B2 | 8/2008 | Esquivel et al. | |
| D695,981 | S | 12/2013 | Myoung | |
| 9,180,479 | B1 | 11/2015 | Ries | |
| D828,087 | S | 9/2018 | Munari | |
| 10,165,900 | B1 | 1/2019 | Rankin, V | |
| 10,166,569 | B1 * | 1/2019 | Ries | B05C 1/06 |
| 10,300,593 | B2 | 5/2019 | Wang | |
| D851,942 | S | 6/2019 | Lee | |
| D854,269 | S | 7/2019 | Meier et al. | |
| D911,037 | S | 2/2021 | Rodriguez et al. | |
| D925,042 | S | 7/2021 | Thao | |
| D948,222 | S | 4/2022 | Gurreri et al. | |
| D968,100 | S | 11/2022 | Gurreri et al. | |
| D987,304 | S | 5/2023 | Gurreri et al. | |
| 2007/0157408 | A1 | 7/2007 | Bargiel et al. | |
| 2017/0197307 | A1 * | 7/2017 | Wang | B25G 3/10 |
| 2018/0353989 | A1 | 12/2018 | Ries | |
| 2022/0203398 | A1 | 6/2022 | Gurreri et al. | |

* cited by examiner

PAD PAINTER SYSTEM

CROSS-REFERENCE TO RELATED APPLICATIONS

This application claims a continuation-in-part of U.S. Design patent application Ser. No. 29/762,494 filed on Dec. 16, 2020, the disclosure of which is expressly incorporated herein in its entirety by reference.

STATEMENT REGARDING FEDERALLY SPONSORED RESEARCH

Not applicable

PARTIES TO A JOINT RESEARCH AGREEMENT

Not Applicable

REFERENCE TO APPENDIX

Not applicable

FIELD OF THE INVENTION

The field of the present invention generally relates to paint application tools and, more particularly, to paint application tools having a pad applicator.

BACKGROUND OF THE INVENTION

A pad painter is the ideal paint application tool for painting ceilings, trim, and tight areas. Unlike a paint brush, a pad painter does not apply paint using bristles. Instead, it applies paint with a replaceable paint pad that is flat often made from, for example but not limited to, polyester, fleece, foam or the like. A paint pad is designed to evenly load and lay paint onto a surface, so it is ideal for painting straight lines and corners. Thus, making it a wise choice for painting edges or trim of a room.

Pad painters typically have a rectangular shaped base which holds a rectangular shaped applicator pad on a front side of the base and a handle that extends from a rear side of the base opposite the applicator pad. Some pad painters have been specifically designed to have a thin profile and an elongated length for holding an elongated applicator pad for use in painting narrow and hard-to-reach areas such as, for example but not limited to, walls behind toilets, radiators, pipes, water heaters, gutters, and the like. For example, see U.S. Pat. Nos. 4,224,713, 9,180,479, 10,166,569, and 10,780,453, the disclosures of which are expressly incorporated herein in their entireties by reference.

While these thin and elongate pad painters can be very effective at painting narrow and difficult to reach areas, it can be difficult to pressure the distal end of the application pad against the wall if the length of the application pad is relatively long. One possible solution to this problem is to make the length of the base and applicator pad shorter. However, this can make the pad painters less effective because there may not be an adequate reach all areas in some applications. Another possible solution is to make the base and the application more rigid so that it does not flex as much when pressured. However, increasing rigidity often can cause also increase weight which can reduce ease—of use and/or performance and also increase manufacturing cost.

Also, there is a never ending desire to increase performance and ease—of use of paint application tools, while at the same reducing manufacturing costs of the paint application tools.

Accordingly, there exists a need for improved pad painter systems, methods, and devices that adequately reach into and paint difficult to reach areas.

SUMMARY OF THE INVENTION

The present invention provides pad painter systems, methods, and devices which address at least one of the above-noted problems of the prior art. Disclosed is a pad painter system comprising, in combination, a pad painter including a base portion and a handle portion extending from the base portion, an applicator pad detachably engageable with the base portion, and a lock mechanism comprising a lock tab formed in the base portion and an tab opening formed in the applicator pad. The lock tab is received in the tab opening to retain the applicator pad to the base portion. The lock tab is formed at a side edge of a wall of the base portion and a wall opening is formed in the wall adjacent the lock tab so that the lock tab can be resiliently deflected out of the tab opening in the applicator pad to release the applicator pad from the base portion.

Also disclosed is a pad painter comprising, in combination, a base portion having a wall, a handle portion extending from the base portion, a lock tab formed at a side edge of the wall of the base portion, and a wall opening formed in the wall adjacent the lock tab so that the lock tab can be resiliently deflected inward toward the opening.

Further disclosed is a pad painter comprising, in combination, a base portion having a wall, a handle portion extending from the base portion, a lock tab formed at a side edge of the wall of the base portion, and a tab flange downwardly extends from a bottom of the wall that extends inwardly from the edge at opposed sides of the lock tab and around an inward side of the lock tab therebetween.

From the foregoing disclosure and the following more detailed description of various preferred embodiments it will be apparent to those skilled in the art that the present invention provides a significant advance in the technology and art of pad painter systems, methods, and devices. Particularly, significant in this regard is the potential the invention affords for providing reliable, relatively inexpensive, easy to use, and effective pad painter systems, methods, and devices for painting in difficult to reach areas. Additional features and advantages of the invention will be better understood in view of the detailed description provided below.

BRIEF DESCRIPTION OF THE DRAWINGS

These and further objects of the invention will become apparent from the following detailed description.

Figure 1:
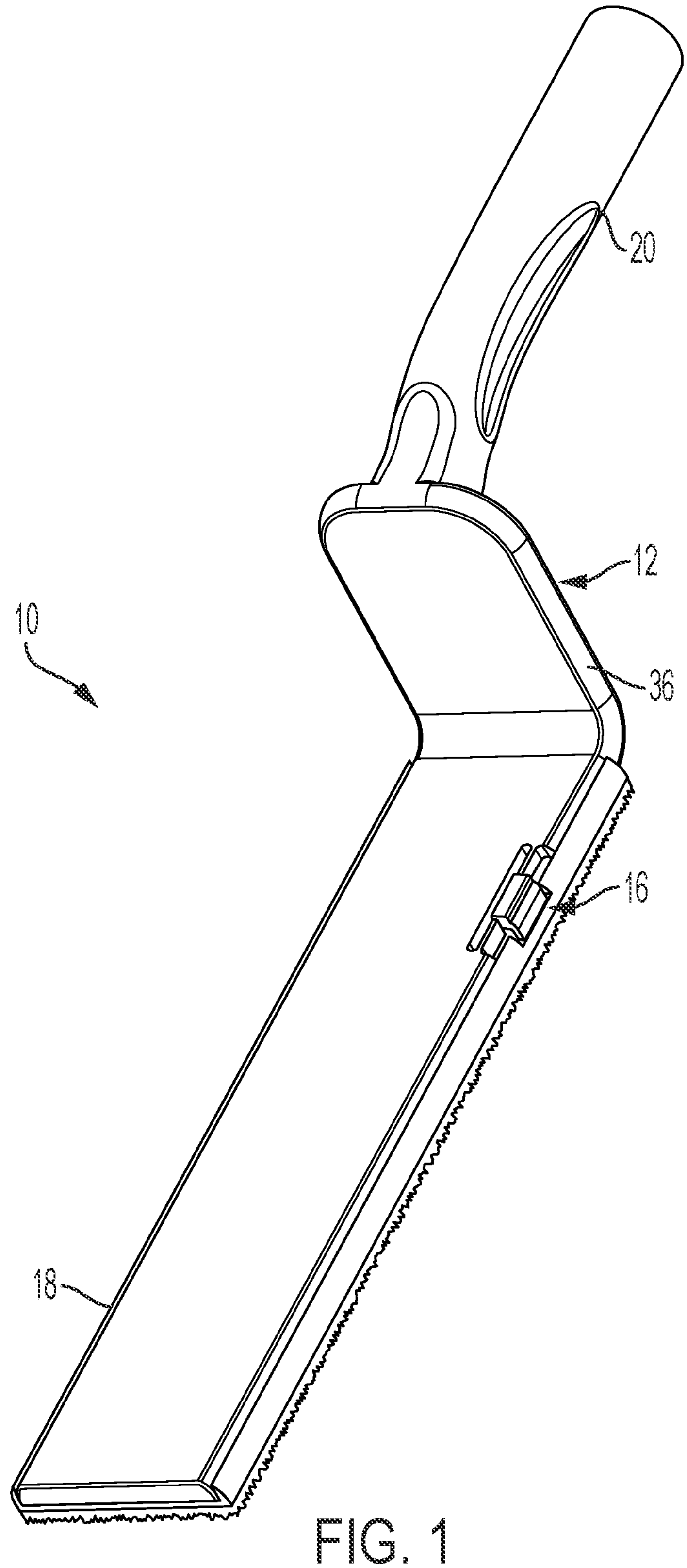
FIG. 1 is a front/top/left perspective view of a pad painter system according to a first embodiment of the present invention.

It should be understood that the appended drawings are not necessarily to scale, presenting a somewhat simplified representation of various preferred features illustrative of the basic principles of the invention. The specific design features of the various pad painter systems as disclosed herein, including, for example, specific dimensions, orientations, locations, and shapes will be determined in part by the particular intended application and use environment. Certain features of the illustrated embodiments may have been enlarged or distorted relative to others to facilitate visualization and clear understanding. In particular, thin features may be thickened, for example, for clarity or illustration. All references to direction and position, unless otherwise indicated, refer to the orientation of the structures illustrated in the drawings. In general, up or upward generally refers to an upward direction within the plane of the page in FIG. 1 and down or downward generally refers to a downward direction within the plane of the page in FIG. 1. Also in general, fore or forward generally refers to a direction out the plane of the page in FIG. 1 and aft or rearward generally refers to an direction into the plane of the page in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the pad painter systems, methods, and devices, disclosed herein. The following detailed discussion of various alternative and preferred embodiments will illustrate the general principles of the invention with regard to the specific application of elongated pad painter systems for painting narrow and hard-to-reach areas. Other embodiments of the invention suitable for other applications will be apparent to those skilled in the art given the benefit of this disclosure such as, for example but not limited to, non-elongated pad painter systems and other types of paint application tools.

Figure 2:
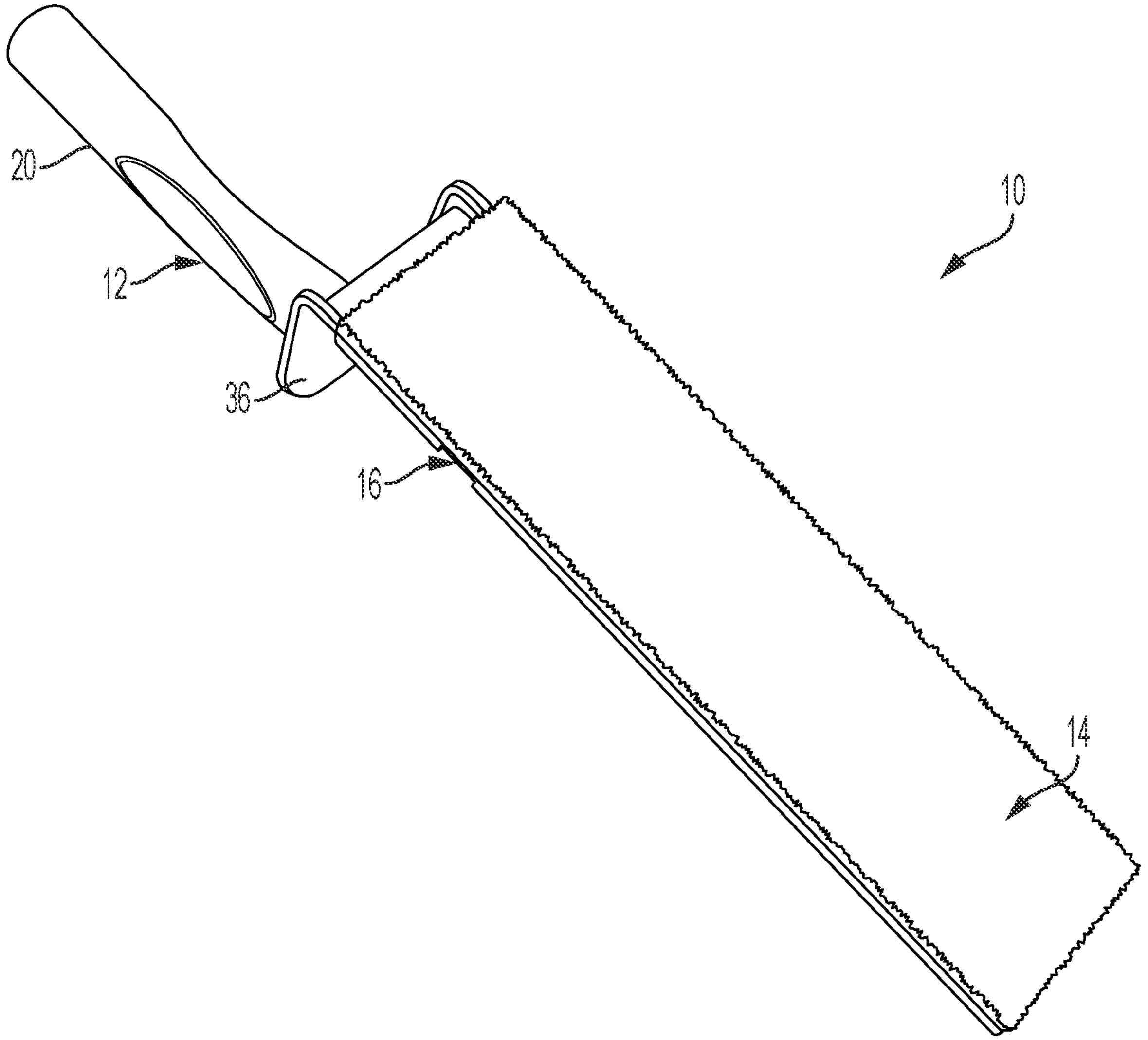
FIG. 2 is front/bottom/left perspective view of the pad painter system of FIG. 1.
Figure 3:
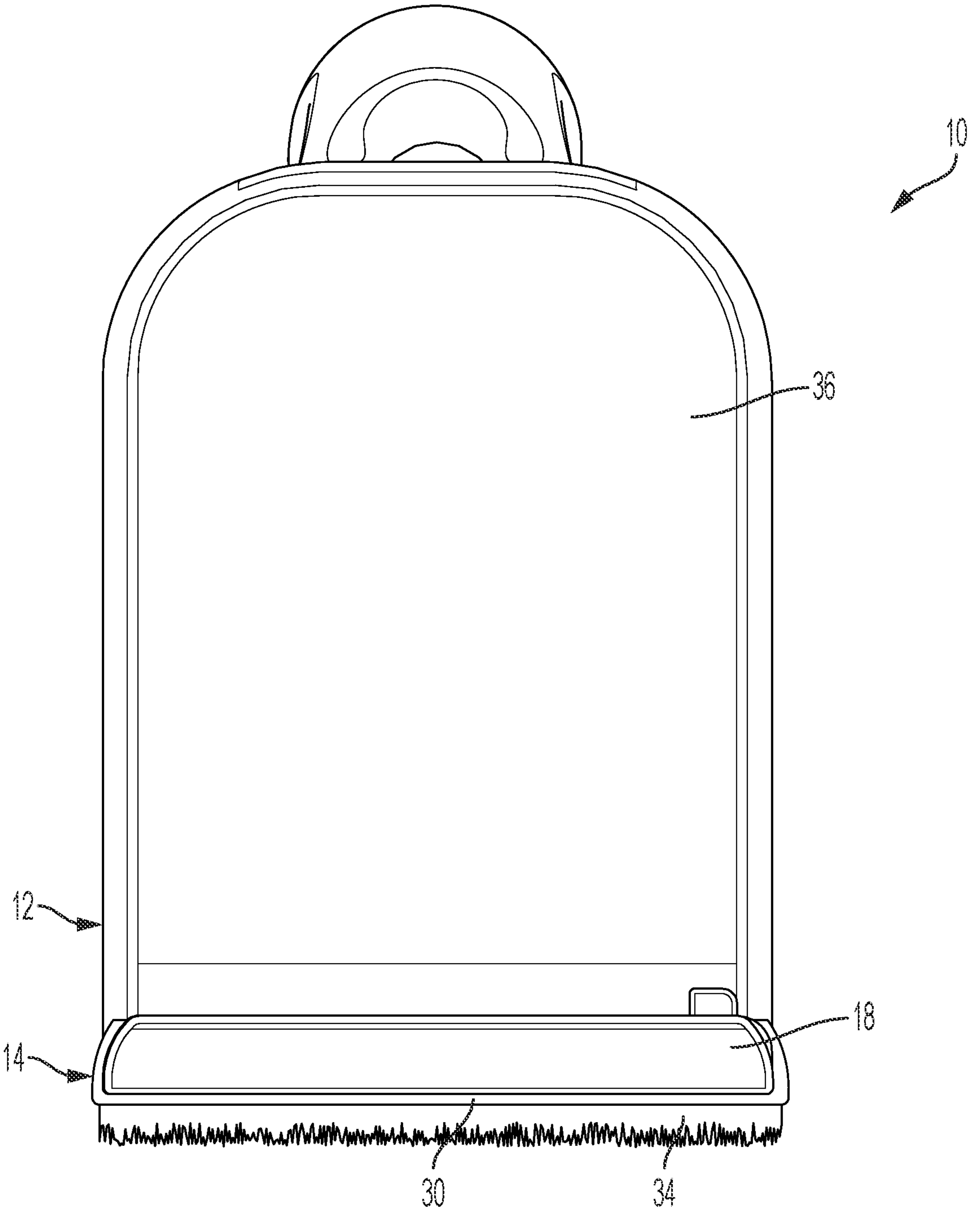
FIG. 3 is front view of the pad painter system of FIGS. 1 and 2.
Figure 4:
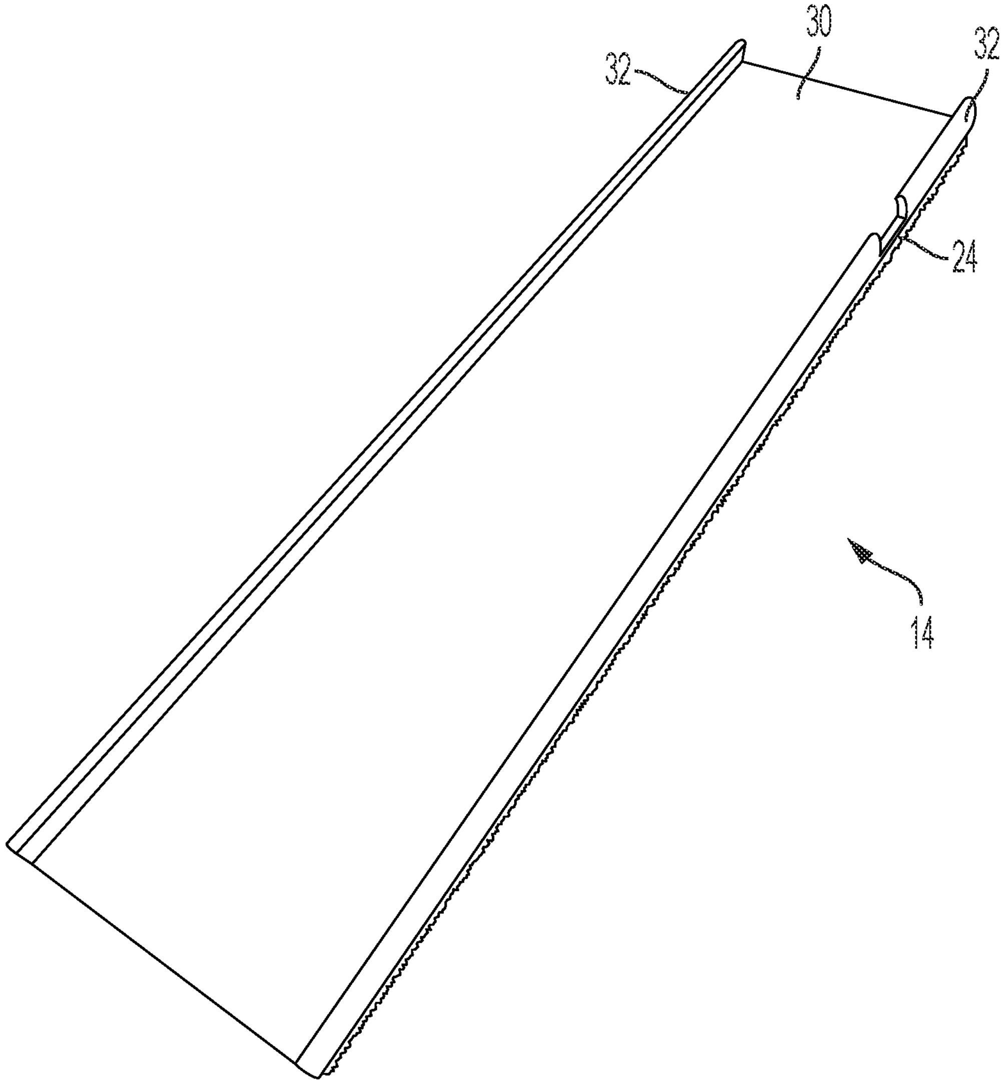
FIG. 4 is a front/top/left perspective view of an applicator pad of the pad painter system of FIGS. 1 to 3.
Figure 5:
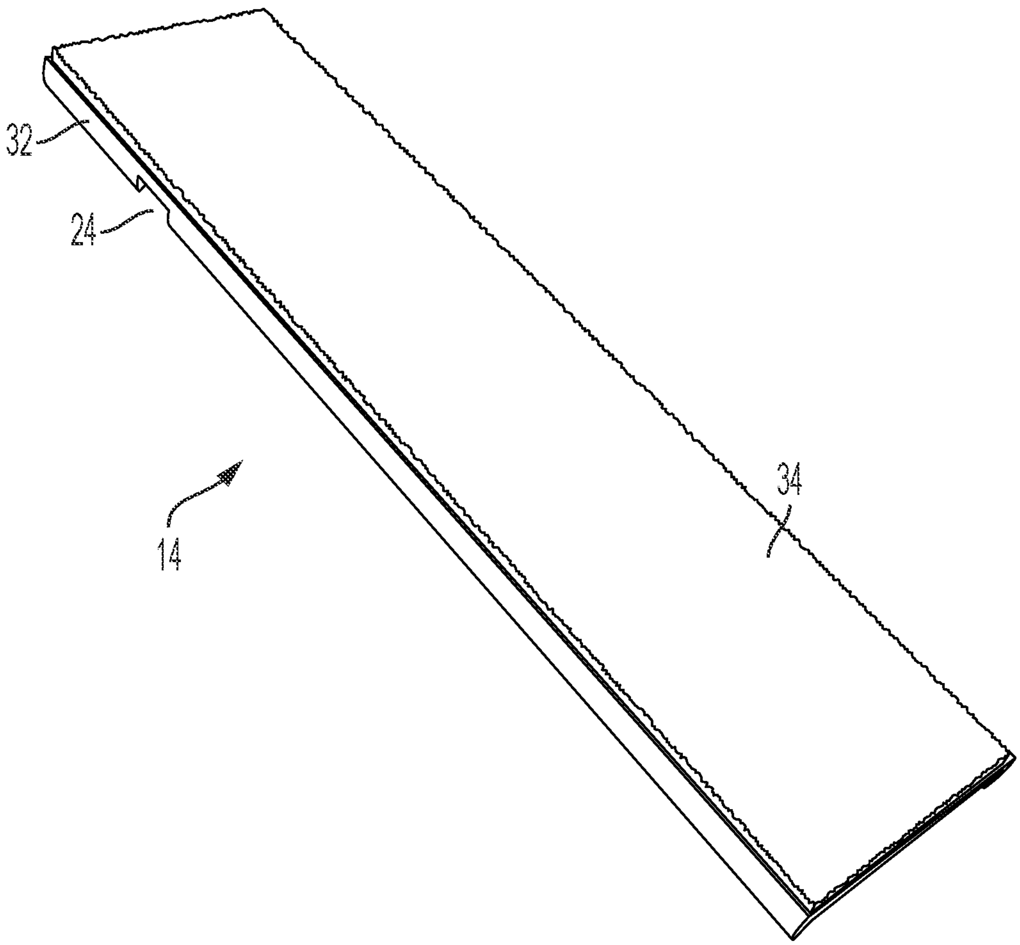
FIG. 5 is a front/bottom/left perspective view of the applicator pad of FIG. 4.
Figure 6:
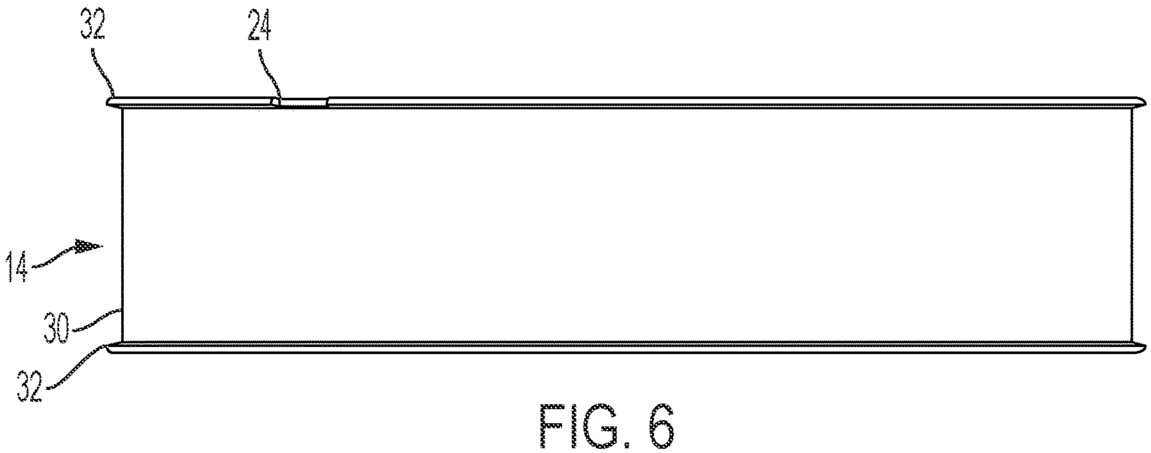
FIG. 6 is a top view of the applicator pad of FIGS. 4 and 5.
Figure 7:
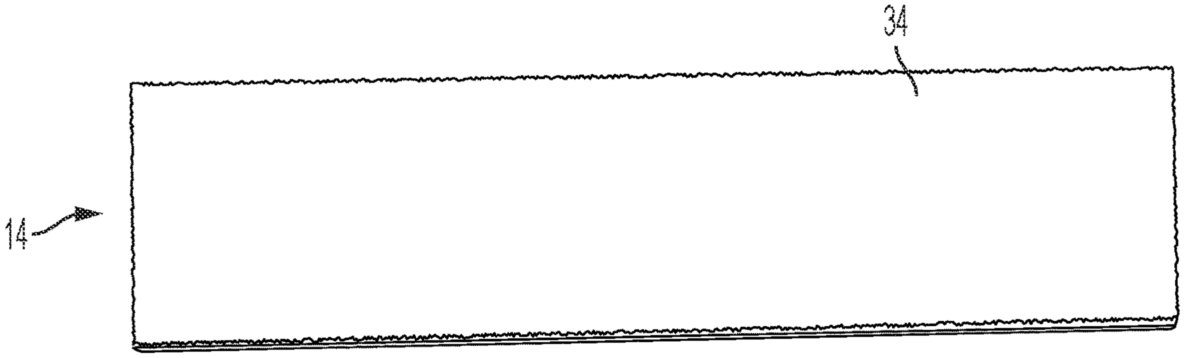
FIG. 7 is a bottom view of the applicator pad of FIGS. 4 to 6.
Figure 8:
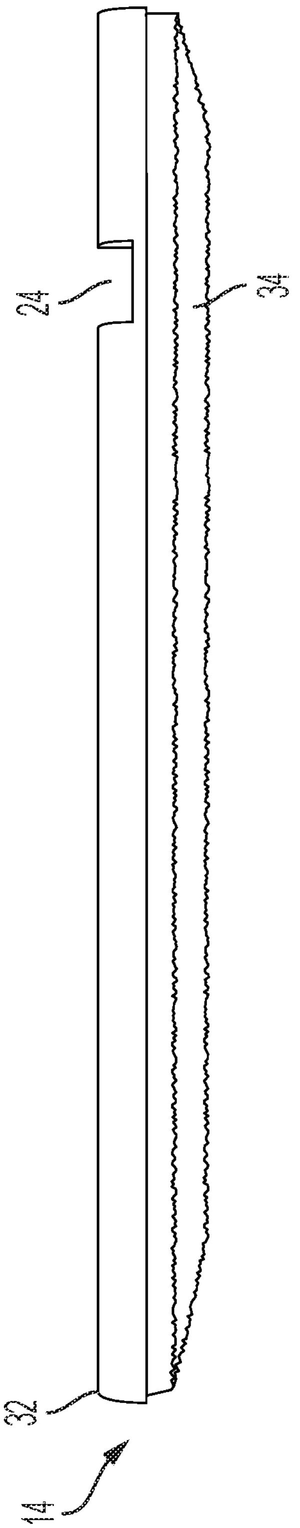
FIG. 8 is a left side view of the applicator pad of FIGS. 4 to 7.
Figure 9:
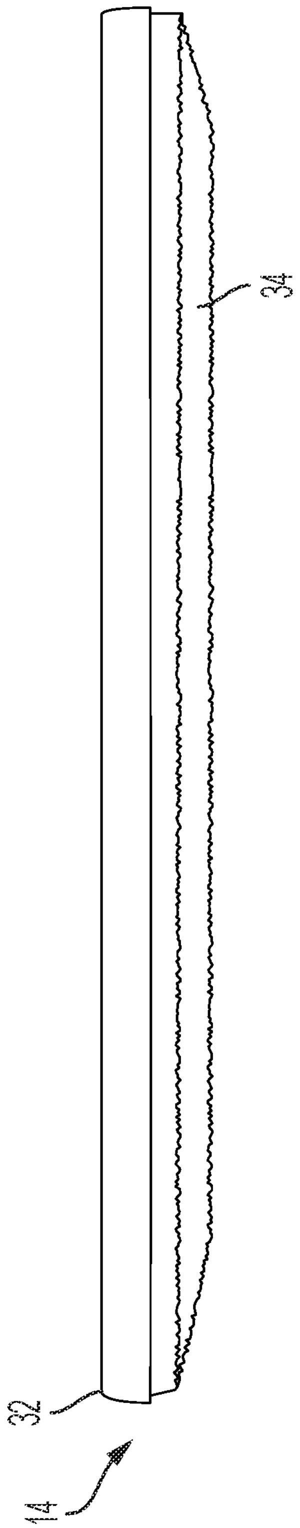
FIG. 9 is a right view of the applicator pad of FIGS. 4 to 8.
Figure 10:
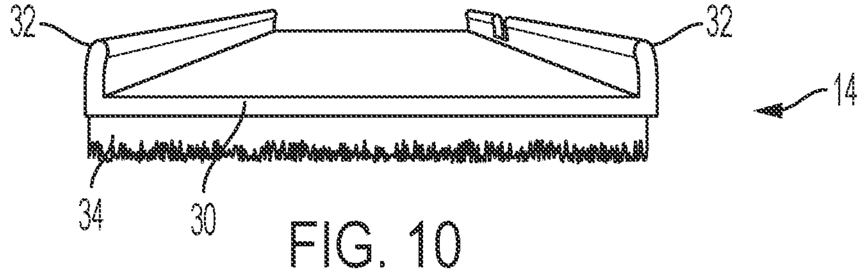
FIG. 10 is a front view of the applicator pad of FIGS. 4 to 9.
Figure 11:
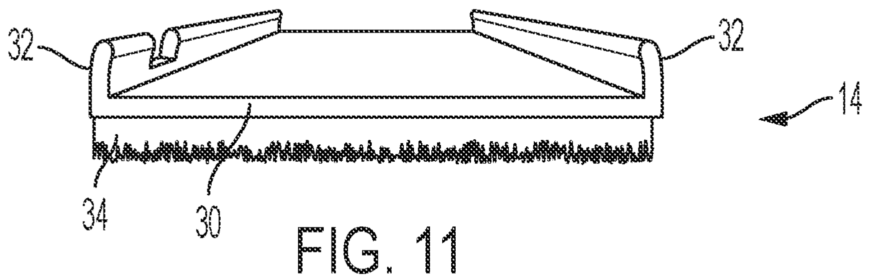
FIG. 11 is a rear view of the applicator pad of FIGS. 4 to 10.
Figure 12:
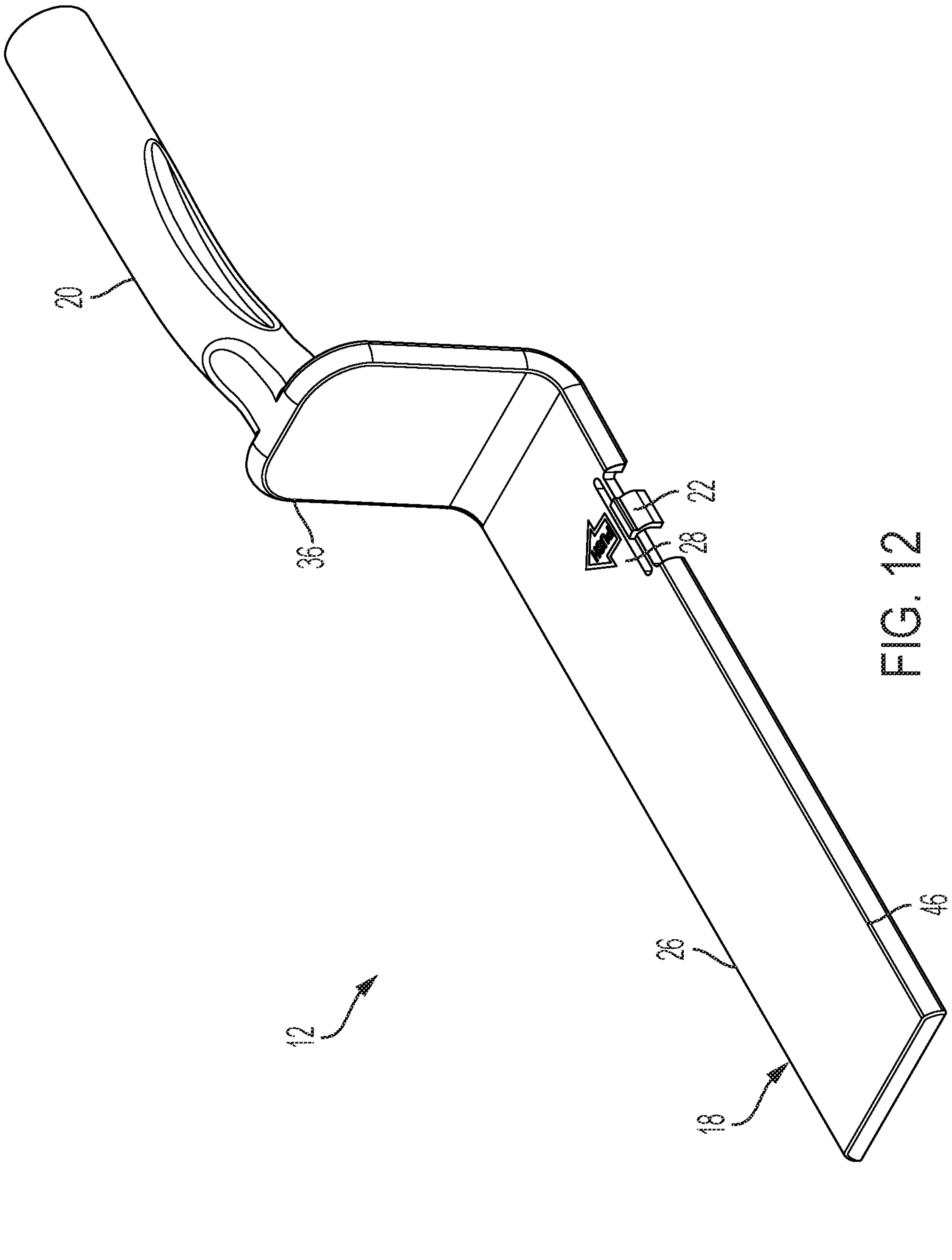
FIG. 12 is a front/top/left perspective view of the pad painter of the pad painter system of FIGS. 1 to 3.
Figure 13:
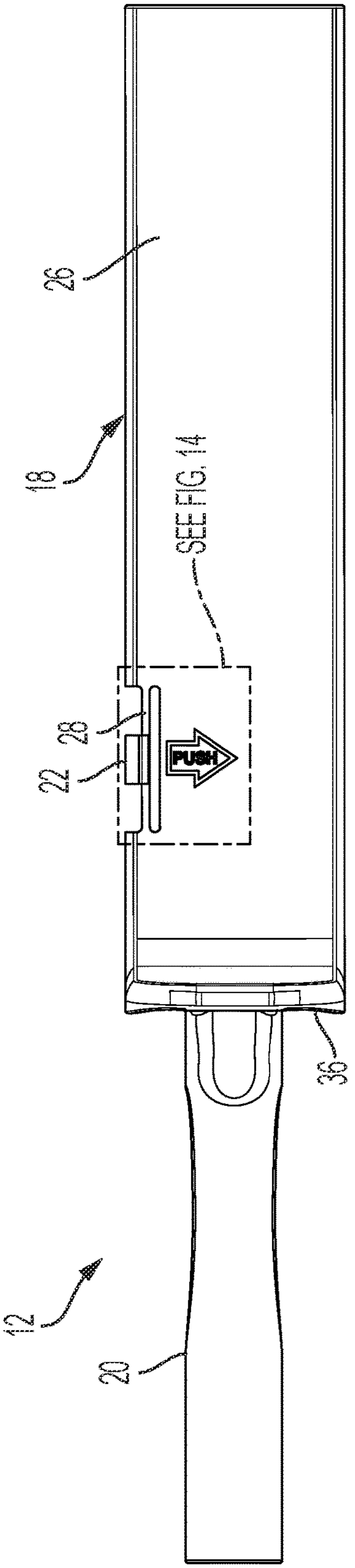
FIG. 13 is a top view of the pad painter of FIG. 12.
Figure 14:
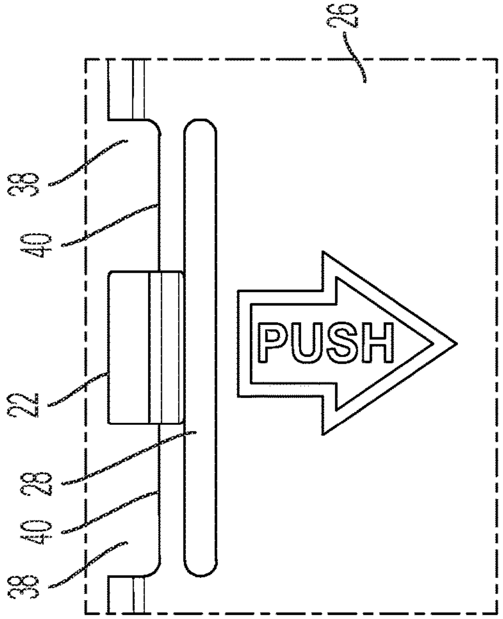
FIG. 14 is an enlarged and fragmented view of a portion of FIG. 13 at a lock tab of the pad painter.
Figure 15:
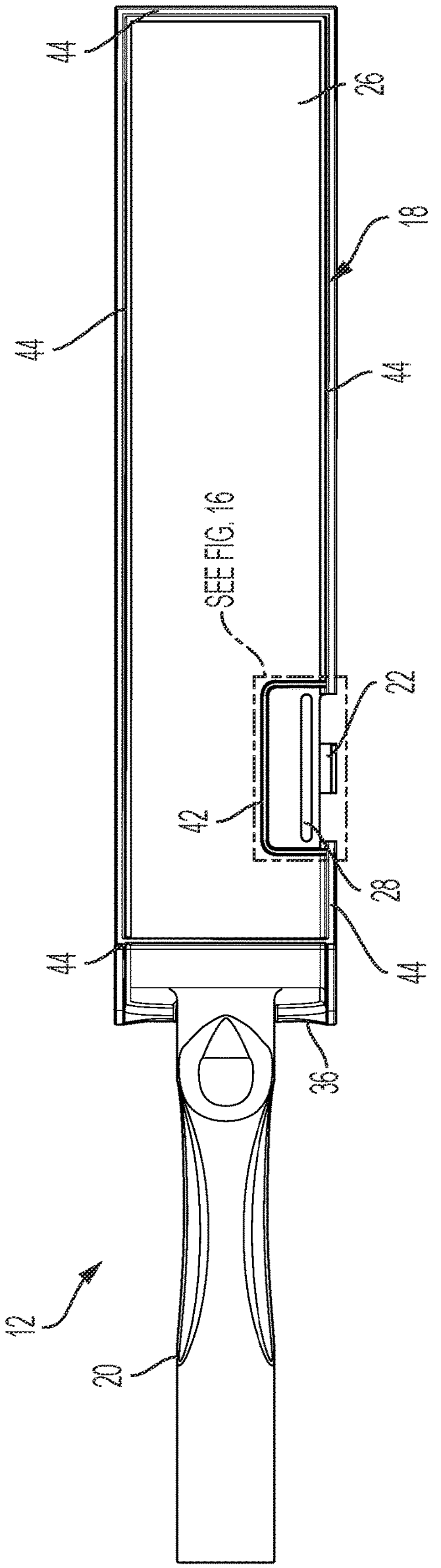
FIG. 15 is a bottom view of the pad painter of FIGS. 12 to 14.
Figure 16:
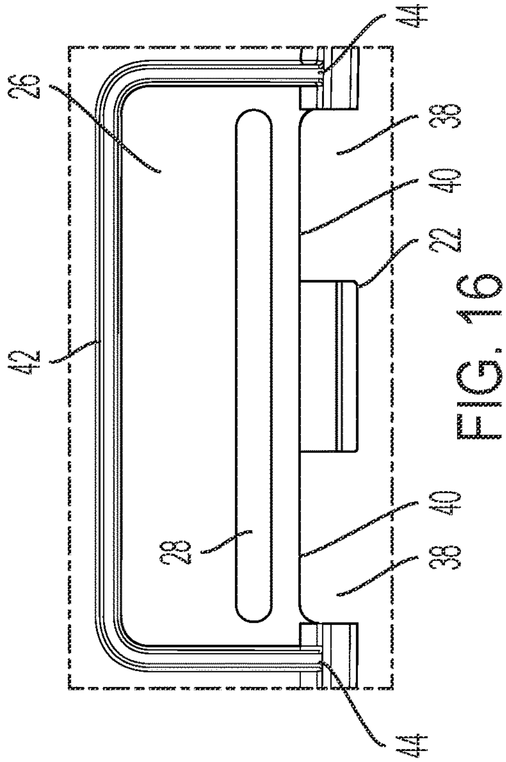
FIG. 16 is an enlarged and fragmented view of a portion of FIG. 15 at a lock tab of the pad painter.
Figure 17:
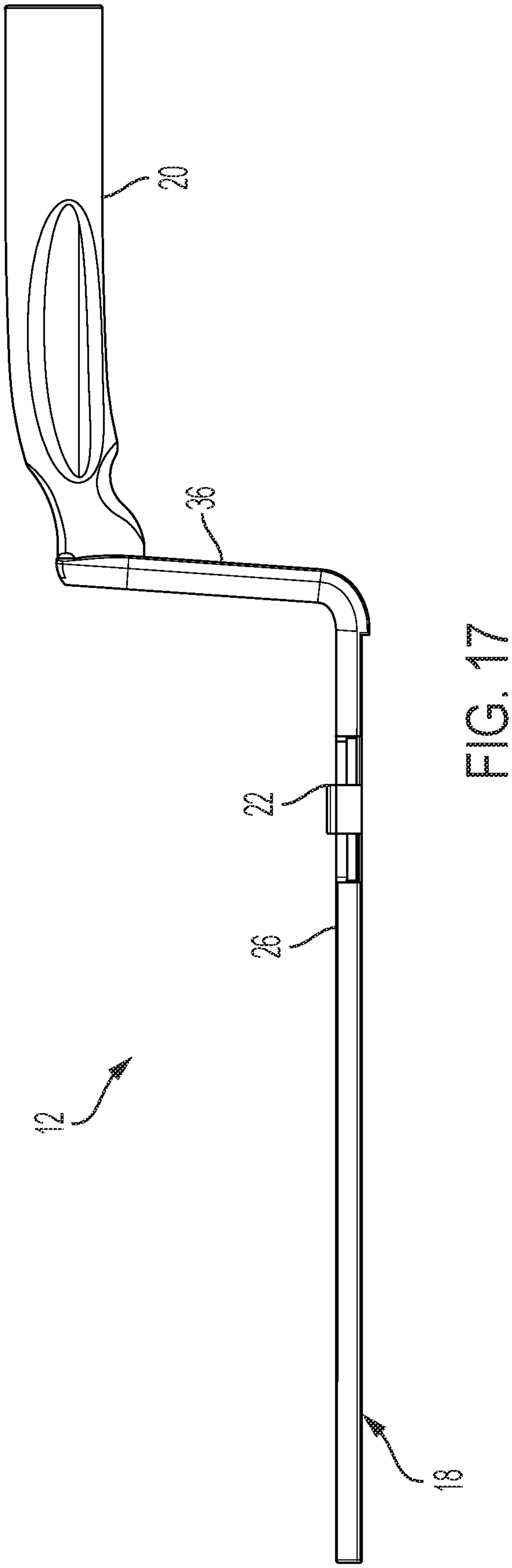
FIG. 17 is a left side view of the pad painter of FIGS. 12 to 16.
Figure 18:
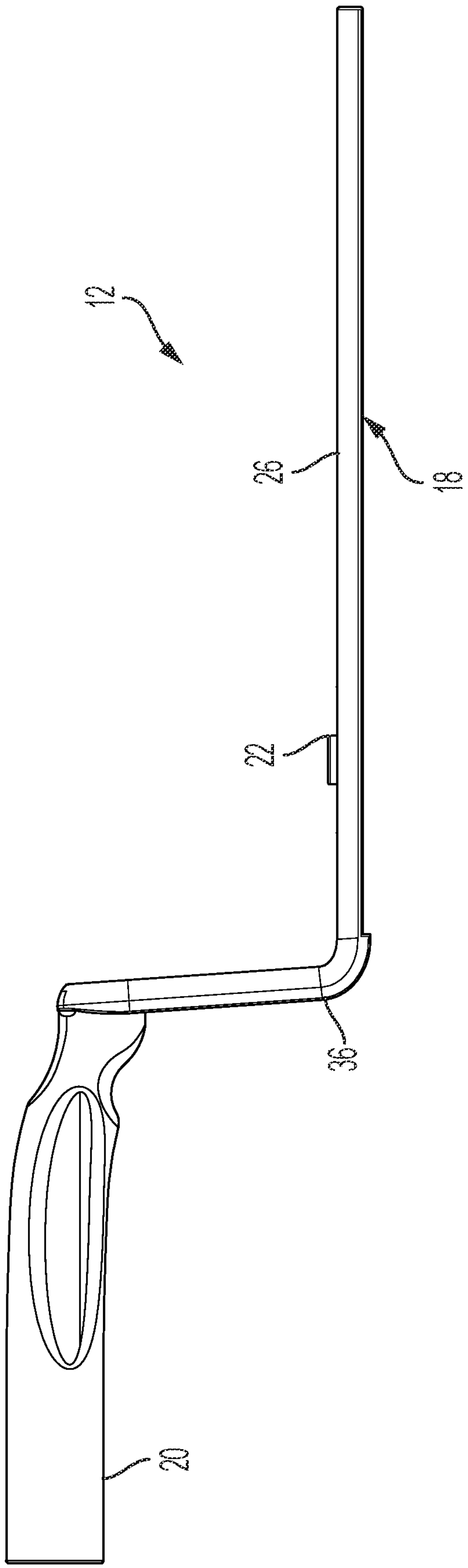
FIG. 18 is a right side view of the pad painter of FIGS. 12 to 17.
Figure 20:
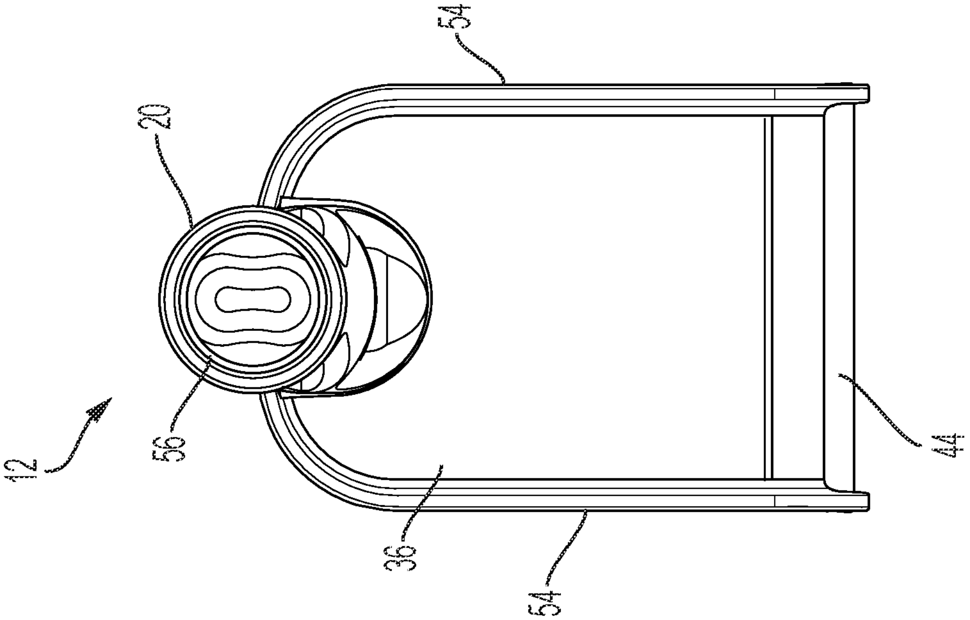
FIG. 20 is a rear view of the pad painter of FIGS. 12 to 19.
Figure 19:
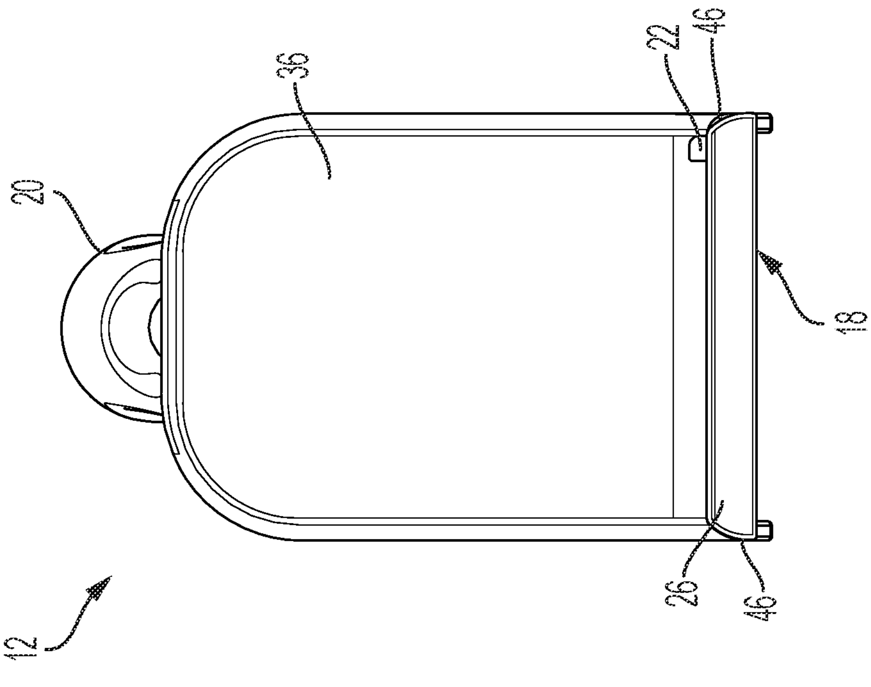
FIG. 19 is a front view of the pad painter of FIGS. 12 to 18.

FIGS. 1 to 3 illustrate an elongate paint pad system 10 according to the present invention. The illustrated elongate paint pad system 10 includes a pad painter 12, an applicator pad 14 detachably engageable with the pad painter 12, and a lock mechanism 16 for releasably retaining the applicator pad 14 to the pad painter 12. The illustrated pad painter 12 includes a base portion 18 and a handle portion 20 extending from the base portion 18. The illustrated lock mechanism 16 includes a lock tab 22 formed in the base portion 18 of the pad painter and a tab opening 24 formed in the applicator pad 14 so that the lock tab 22 is received in the tab opening 24 to retain the applicator pad 14 to the base portion 18 as described in more detail hereinafter. The illustrated lock tab 22 is formed at a lateral side edge of a wall 26 of the base portion 18 and a wall opening 28 is formed in the wall 26 of the base portion 18 adjacent the lock tab 22 so that the lock tab 22 can be resiliently deflected out of the tab opening 24 in the applicator pad 14 to selectively release the applicator pad 14 from the base portion 18 of the pad painter 12. It is noted that the lock mechanism 16 can alternatively include a lock tab 22 formed in the applicator pad 14 and a tab opening 24 formed in the base portion 18 of the pad painter so that the lock tab 22 is received in the tab opening 24 to retain the applicator pad 14 to the base portion 18 as described in more detail hereinafter in connection with FIGS. 23 and 24.

FIGS. 4 to 11 illustrate the applicator pad 14. The illustrated applicator pad 14 includes a planar pad wall 30 that is rectangular shaped. Each edge of the pad wall 30 is straight and perpendicular to adjacent edges. The straight outer or distal end enables corners to be more efficiently painted. It is noted that the pad wall 30 can alternatively have any other suitable shape. The illustrated pad wall 30 is also elongate. That is, it has a length is at least about four times its width. The applicator pad 14 can have any suitable length and width such as, for example but not limited to, a length of about 6 to 12 inches. and a width of about 1.5 to 3 inches. The illustrated applicator pad 14 has length of about 9 inches and a width of about 2.25 inches.

Arcuate arms or side walls 32 upwardly extend from lateral edges of the pad wall 30 for the full length of the pad wall. 30 The illustrated arms 32 are each arcuate having a concave surface on an inner side. The arms are sized and shaped to cooperate with the pad painter 12 as described in more detail hereinafter. The illustrated tab opening 24 is located in the arm 32 on the left-side near a rear end of the on the arm 32. It is noted that the tab opening 24 can alternatively have any other suitable location to cooperate with the lock tab 22. The illustrated tab opening 24 is in the shape of a rectangular notch formed in the upper end of the arm 32 so that the rectangular notch is open at its upper side. It is noted that while the illustrated tab opening 24 is in the form of a rectangular notch, the tab opening 24 can alternatively have any other suitable shape. The tab opening 24 is sized, shaped, and located to cooperate with the lock tab 22 as described in more detail hereinafter. While the illustrated applicator pad 14 is provided with only one tab opening 24, it is noted that there can alternatively be a plurality of tab openings 24 for cooperating with a plurality of lock tabs 22 and/or for positioning the applicator pad 14 at different locations on the pad painter 12. The illustrated pad wall 30 is molded of a suitable plastic but it is noted that any other suitable material can alternatively be utilized such as, for example but not limited to, metal, composite, some combination thereof, and the like.

The illustrated applicator pad 14 also has a paint pad 34 secured to a lower side of the pad wall 30. The illustrated paint pad 34 is sized to cover the entire lower surface of the pad wall 30. It is noted that alternatively there can be more than one paint pad 34 and/or the paint pad(s) 34 can cover less than the entire lower side of the pad wall 30. The paint pad 34 can be formed of any suitable material that has the ability to absorb paint to facilitate applying paint to a surface to be painted. The material can be, for example but not limited to, foam, bristles, woven or non-woven fabric, some combination thereof, and the like. The paint pad 34 can be secured to the lower side of the pad wall 30 in any suitable manner such as, for example but not limited to, adhesive and the like.

FIGS. 12 to 21 illustrate the pad painter 12. The illustrated pad painter 12 includes the base portion 18, the handle portion 20 rearwardly extending from a rear or proximal end of the base portion 18, and an intermediate or connecting portion 36 connecting the rear or proximal end of the base portion 18 with the front or distal end of the handle portion 20.

The illustrated base portion 18 includes the planar wall 26 that is rectangular with each edge straight and perpendicular to adjacent edges. It is noted that the wall 26 can alternatively have any other suitable shape. The illustrated wall 26 is also elongate. That is, its length is at least about four times its width. The wall 26 can have any suitable length and width such as, for example but not limited to, a length of about 6 to 12 inches. and a width of about 1.5 to 3 inches. The illustrated wall has length of about 9 inches and a width of about 2.25 inches. Thus, the illustrated wall 26 is sized and shaped to match and cooperate with the applicator pad 14.

The illustrated lock tab 22 is formed in and located along the left-edge of the wall 26 near a rear end of the wall 26. It is noted that the lock tab 22 can alternatively have any other suitable location to cooperate with the tab opening 24 of the applicator pad 14. The lock tab 22 is sized, shaped, and located to cooperate with the tab opening 24 as described in more detail hereinafter. While the illustrated wall 26 is provided with only one lock tab 22, it is noted that there can alternatively be a plurality of lock tabs 22 for cooperating with a plurality of the tab openings 24 and/or for positioning the applicator pad 14 in different locations on the pad painter 12.

The illustrated wall 26 has the wall opening 28 formed adjacent the lock tab 22 and laterally inward of the lock tab 22 so that the lock tab 22 can be resiliently deflected inward and out of the tab opening 24 in the applicator pad 14 to selectively release the applicator pad 14 from the base portion 18 of the pad painter 12 as described in more detail hereinafter. The illustrated wall opening 28 is shaped as an elongate slot parallel with the lateral edge of the wall 26 and spaced-apart from the lateral edge of the wall 26 laterally inward of the lock tab 22. The length of the illustrated wall opening extends in the forward-rearward direction so that the narrower width extends in the lateral direction. It is noted that the wall opening 28 can alternatively have any other suitable shape and/or configuration. The illustrated wall 26 also includes pair of notches 38 extending inwardly from the lateral edge of the wall 36 and at opposed ends of the lock tab 22. Laterally inner sides of the notches 38 are spaced apart from the wall opening 28 so that the lock tab 22 is connected by only thin webs 40 of material extending from front and rear ends of the lock tab 22. The illustrated notches 38 increase the ability of resiliently deflecting the lock tab 22 inwardly. The forward and rearward ends of the lock tab 22 form abutments that engage the ends of the tab opening 24 to secure the applicator pad 14 to the pad painter 12 as described in more detail hereinafter. It is noted that the lock tab 22 can alternatively be formed in any other suitable manner.

The illustrated base portion 18 also includes a tab flange 42 downwardly extending from a bottom side of the wall 26. The illustrated tab flange 42 extends inwardly from the lateral edge of the wall 26 adjacent each end of the wall opening 28 and around an inward side of the wall opening 28 therebetween. The illustrated tab flange 42 is generally U shaped with the lock tab 22 located at the outer open end. The illustrated tab flange 42 stiffens and/or strengthens a portion of the wall 26 at the lock tab 22. It is noted that the tab flange 42 can alternatively any other suitable shape that encircles the lock tab 22 and/or any other suitable configuration.

The illustrated base portion 18 also includes a perimeter flange 44 downwardly extending from a bottom side of the wall 26. The perimeter flange 44 extends at the edge of the wall 26 along a perimeter of the wall 16 except adjacent to the wall opening 28. That is, adjacent the notches 38 and the lock tab 22 which collectively have the same length as the illustrated wall opening 28. The illustrated perimeter flange 44 extends slightly past the outer ends of the tab flange 42 due to the gap or space between the tab flange 42 and the ends of the illustrated wall opening 28 in the forward-rearward direction. The perimeter flange 44 along with the tab flange 42 stiffens and/or strengthens the base portion 18. It is noted that the perimeter flange 44 can alternatively have any other suitable shape and/or configuration.

The illustrated top surface of the wall 26 of the illustrated base portion 18 is substantially planar. It is noted that the illustrated base portion 18 is free of any other flanges or ribs within the perimeter formed by the tab flange 42 and the perimeter flange 44. Within the flanges 42, 44, the bottom surface of the wall 26 of the illustrated base portion 18 is substantially planar. It is noted that the base portion 18 can alternatively have any other suitable shape and/or configuration.

The lateral edges of the wall 26 and the portion of the perimeter flange 44 along the lateral sides of the wall 26 cooperate to form arcuate lateral sides 46 of the base portion 18. The arcuate lateral sides 46 are convex and are sized and shaped to cooperate with the concave inner sides of the arms 32 of the applicator pad 14. With the arms 32 of the applicator pad 14 partially surrounding the convex lateral sides 46 of the base portion 18, the applicator pad 14 can slide relative to the base portion 18 in the forward-rearward direction but relative movement in each other direction is limited or prevented. Once the lock tab 22 of the base portion 18 snaps into the tab opening 24 of the applicator pad 14, relative movement in the forward-rearward direction is limited by the lock tab 22 engaging ends of the tab opening 24 to secure the pad applicator 14 to the base portion 18 of the pad painter 12. To remove the applicator pad 14 from the base portion 18, the lock tab 22 is resiliently pushed inward by a user until the lock tab 22 is out of the tab opening 24 of the pad applicator 14 and the pad applicator 14 can be slid off of the base portion 18. Once the lock tab 22 is released by the user, the lock tab 22 resiliently snaps back outwardly to its un-deflected position.

Figure 21:
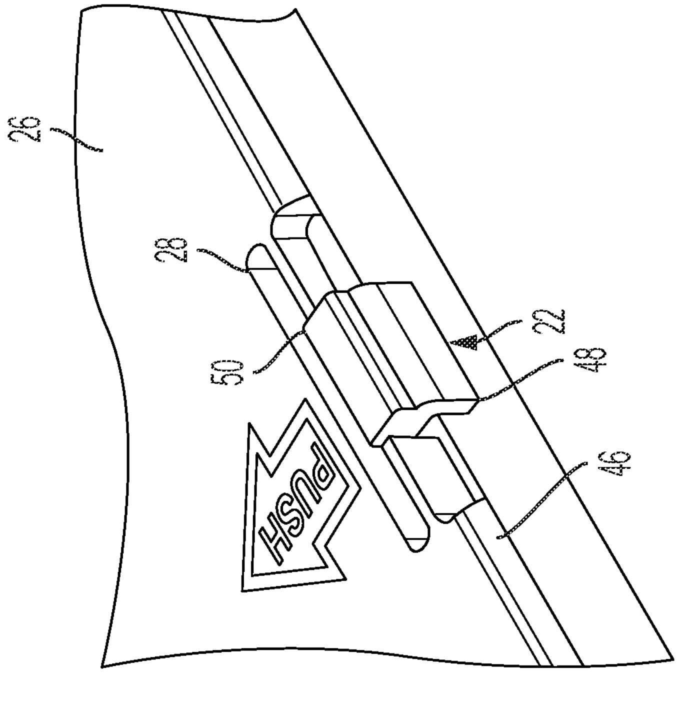
FIG. 21 is an enlarged and fragmented view of a portion of FIG. 12 at the lock tab of the pad painter.

As best shown in FIG. 21, the laterally outer side of the illustrated lock tab 22 has a lower portion 48 with an arcuate and convex shape, The arcuate lower portion 48 of the lock tab 22 is shaped to match the arcuate and convex shape of the lateral sides 36 of the base portion 18. Such a configuration enables the interference between the lock tab 22 and the tab opening 24 as soon as the arcuate lower portion 48 of the lock tab 22 is aligned with the arcuate lateral side 46 of the base portion 18. Thus, the required deflection of the lock tab 22 to remove the interference can be minimized. An upper portion 50 of the illustrated lock tab 22 is narrow in the lateral direction and is located at an inner side of the lock tab 22 as to not form an interference with the applicator pad 14. The illustrated upper portion 50 extends upwardly above the top side of the wall 26 to provide additional surface for pushing the lock tab 22 in the laterally inward direction. It is noted that the lock tab 22 can alternatively have any other suitable shape and/or configuration.

Figure 22:
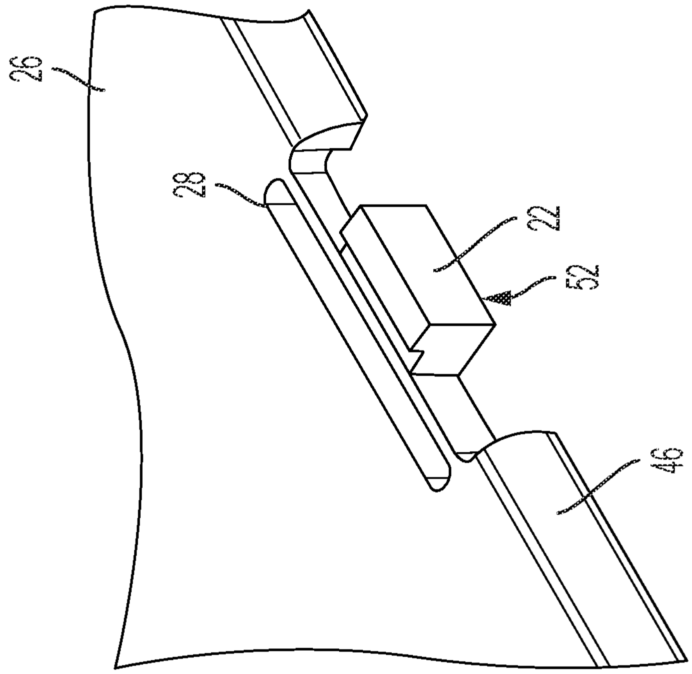
FIG. 22 is an enlarged and fragmented view similar to FIG. 21 but showing an alternative lock tab for the pad painter.

FIG. 22 illustrates an alternative lock tab **22*a*. The alternative lock tab 22*a* has a generally rectangular shape. An outer surface 52 of the lock tab 22 is substantially planar and outer surface 52 of the illustrated lock tab 22*a* extends upwardly above the top side of the wall 26 of the base portion 18. It is noted that the lock tab 22*a*** can alternatively have any other suitable shape and/or configuration.

The illustrated base portion 18 is molded of a suitable plastic but it is noted that any other suitable material can alternatively be utilized such as, for example but not limited to, metal, composite, some combination thereof, and the like and/or any other suitable method of forming the base portion 18 can alternatively be utilized.

As best shown in FIGS. 12 to 21, the illustrated intermediate or connecting portion 36 connects the rear or proximal end of the base portion 18 with the front or distal end of the handle portion 20. The illustrated connecting portion 36 includes a wall 52 having an upper portion extending substantially vertical and lower portion forming a rounded corner between the rear or proximal end of the base portion 18 and the lower end of the upper portion of the connecting portion 36. The illustrated upper portion is sized and shaped to be a vertical extension of the base portion 18. The upper portion is preferably vertical but may have a slight draft angle if molded of plastic. The illustrated upper end of the upper portion is provided with rounded corners in place of sharp corners. The front side of the upper portion of the connecting portion 36 is generally planar. The rear side of the connecting portion is provided with a perimeter flange 54 rearwardly extending from the upper portion and downwardly extending from the lower portion. The perimeter flange 54 extends along the perimeter of the connecting portion 36 to form an extension of the perimeter flange 44 of the base portion 18. It is noted that the perimeter flange 54 can alternatively have any other suitable shape and/or configuration. Within the perimeter flange 54, the rear side of the upper portion is substantially planar and free of any other ribs or flanges. It is also noted that connecting portion 36 can alternatively have any other suitable shape and/or configuration.

The illustrated connecting portion 36 is molded of a suitable plastic but it is noted that any other suitable material can alternatively be utilized such as, for example but not limited to, metal, composite, some combination thereof, and the like and/or any other suitable method of forming the connecting portion 36 can alternatively be utilized.

The illustrated handle portion 29 rearwardly extends from the rear side of the connecting portion 36 and thus extends from a rear or proximal end of the base portion 26. The illustrated handle portion 20 rearwardly extends from the top if the connecting portion 36 in a horizontal manner such that it is generally parallel and vertically offset from base portion 18. The illustrated offset is about 3 inches but any other suitable offset can alternatively be utilized. The illustrated handle portion 20 is ergonomically shaped but the handle portion 20 can alternatively have any other suitable shape such as, for example but not limited to cylindrical or the like. A rear end portion of the illustrated handle portion 20 is provided with internal threads 56 for attachment of an externally threaded end of an extension pole (not shown). The internal threads 56 can alternatively be eliminated if desired. It is noted the handle portion 20 can alternatively have any other suitable shape and/or configuration.

The illustrated handle portion 20 is molded of a suitable plastic but it is noted that any other suitable material can alternatively be utilized such as, for example but not limited to, metal, composite, some combination thereof, and the like and/or any other suitable method of forming the handle portion 20 can alternatively be utilized.

The illustrated base, connecting, and handle portions 18, 36, 20 are each molded of plastic. The illustrated pad painter 12 is formed as a one-piece plastic component. It is noted however that the base, connecting, and handle portions 18, 36, 20 can alternatively be secured together in any other suitable manner.

Figure 23:
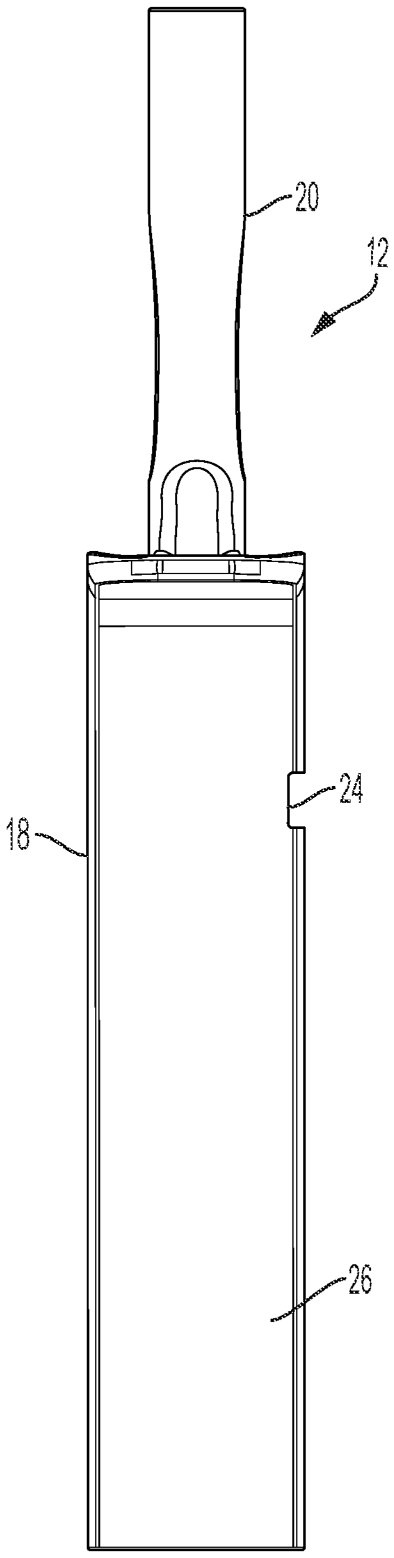
FIG. 23 is top view of a pad painter of a pad painter system according to a second embodiment of the present invention.
Figure 24:
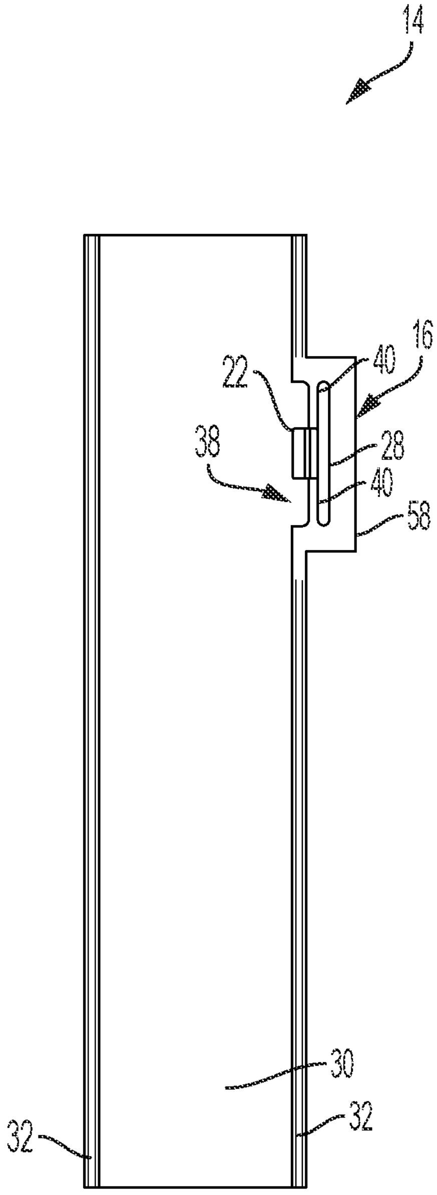
FIG. 24 is a top view of an applicator pad of the pad painter system according to the second embodiment of the present invention.

FIGS. 23 and 24 illustrate a second embodiment of the paint pad system according to the present invention. The paint pad system according to the illustrated second embodiment is substantially the same as the paint pad system according to the above illustrated first embodiment except that the lock tab 22 and the tab opening 24 of the lock mechanism 16 are reversed between the pad painter 12 and the applicator pad 14. That is, the lock tab 22 is formed in the applicator pad 14 and the tab opening 24 formed in the pad painter 12 so that the lock tab 22 is received in the tab opening 24 to retain the applicator pad 14 to the pad painter 12.

The illustrated tab opening 24 is formed at a lateral side edge of the wall 26 of the pad painter base portion 18. The illustrated lock tab 24 is formed at one of the arms 32 of the applicator pad 14. The tab opening 24 and the lock tab 24 are each sized, shaped and positioned so that the lock tab 22 is received in the tab opening 24 to removably retain the applicator pad 14 to the base portion 18 of the pad painter 12 when the applicator pad 14 is slid onto the base portion 18 of the pad painter. The tab opening 24 and the lock tab 24 are also each sized, shaped and positioned so that the lock tab 22 can be resiliently deflected out of the tab opening 24 to selectively release the applicator pad 14 from the base portion 18 of the pad painter 12 and enable the applicator pad 14 to be slid off the base portion 18 of the pad painter 12.

A wall 58 horizontally and laterally extends outward from the arm 32 of the pad applicator 14. The wall 58 has the lock tab 22 formed at an inner side thereof and has a wall opening 28 formed adjacent thereto. The opening 28 is formed laterally outward of the lock tab 22 so that the lock tab 22 can be resiliently deflected outward and out of the tab opening 24 in base portion 18 of the pad painter 12 to selectively release the applicator pad 14 from the base portion 18 of the pad painter 12. The illustrated wall opening 28 is shaped as an elongate slot parallel with the lateral edge of the wall 26 and spaced-apart from the lateral edge of the wall 26 laterally outward of the lock tab 22. The length of the illustrated wall opening extends in the forward-rearward direction so that the narrower width extends in the lateral direction. It is noted that the wall opening 28 can alternatively have any other suitable shape and/or configuration. The illustrated wall 58 also includes pair of notches 38 extending outwardly from the lateral edge arm 32 and at opposed ends of the lock tab 22. Laterally outer sides of the notches 38 are spaced apart from the wall opening 28 so that the lock tab 22 is connected by only thin webs 40 of material extending from front and rear ends of the lock tab 22. The illustrated notches 38 increase the ability of resiliently deflecting the lock tab 22 outwardly. The forward and rearward ends of the lock tab 22 form abutments that engage the ends of the tab opening 24 to secure the applicator pad 14 to the pad painter 12 as described in more detail hereinafter. It is noted that the lock tab 22 can alternatively be formed in any other suitable manner.

The illustrated tab opening 24 is located in the wall 26 on the left-edge near a rear end of the wall 26. It is noted that the tab opening 24 can alternatively have any other suitable location to cooperate with the lock tab 22. The illustrated tab opening 24 is in the shape of a rectangular notch with the notch open at its outer side. It is noted that while the illustrated tab opening 24 is in the form of a rectangular notch, the tab opening 24 can alternatively have any other suitable shape. The tab opening 24 is sized, shaped, and located to cooperate with the lock tab 22. While the illustrated pad painter 12 is provided with only one tab opening 24, it is noted that there can alternatively be a plurality of tab openings 24 for cooperating with a plurality of lock tabs 22 and/or for positioning the applicator pad 14 at different locations on the pad painter 12. It is noted that the tab opening 24 can alternatively be formed in any other suitable manner. It is also noted that the lock mechanism 16 can alternatively have any other suitable configuration.

It is noted that each of the features of the various disclosed embodiments of the present invention can be utilized in any combination with each of the other disclosed embodiments of the present invention.

From the above disclosure it can be appreciated that the systems, methods and devices according to the present invention can provide reliable, relatively inexpensive, easy to use, and effective means for painting, particularly in narrow and difficult to reach areas.

The preferred embodiments of this invention can be achieved by many techniques and methods known to persons who are skilled in this field. To those skilled and knowledgeable in the arts to which the present invention pertains, many widely differing embodiments will be suggested by the foregoing without departing from the intent and scope of the present invention. The descriptions and disclosures herein are intended solely for purposes of illustration and should not be construed as limiting the scope of the present invention.

What is claimed is:

1. A pad painter system comprising, in combination:
- a pad painter including an elongated base portion and a handle portion rearwardly extending in a longitudinal direction from a vertical standing connecting portion of the base portion, a length of the elongated base portion being greater than a width of the elongated base portion and the length extending parallel to the longitudinal direction of the handle portion;
- an applicator pad detachably engageable with the base portion; and
- a lock mechanism comprising a lock tab formed in the base portion and a tab opening formed in the applicator pad, wherein the lock tab is received in the tab opening to retain the applicator pad to the base portion,
- wherein the lock tab is formed at a lateral side edge of a wall of the base portion and a wall opening is formed in the wall adjacent to the lock tab so that the lock tab can be resiliently deflected out of the tab opening in the applicator pad to selectively release the applicator pad from the base portion,
- wherein the wall and wall opening extend along the length of the base portion, and
- wherein the wall opening is an elongated opening parallel with the lateral side edge of the wall and inwardly spaced from the lateral side edge of the wall, a length of the elongated opening extending parallel to the longitudinal direction of the handle portion.

2. The pad painter system according to claim 1, wherein the pad painter is formed as a one-piece plastic component.

3. The pad painter system according to claim 1, wherein the slot is longer than the lock tab.

4. The pad painter system according to claim 1, wherein a tab flange downwardly extends from a bottom of the wall and extends inwardly from the edge adjacent each end of the slot and around an inward side of the slot therebetween.

5. The pad painter system according to claim 4, wherein a perimeter flange downwardly extends from a bottom of the wall at the edge of the wall along a perimeter of the wall except adjacent to the slot.

6. The pad painter system according to claim 1, wherein a tab flange downwardly extends from a bottom of the wall and extends inwardly from the edge adjacent each end of the wall opening and around an inward side of the wall opening therebetween.

7. The pad painter system according to claim 6, wherein a perimeter flange downwardly extends from a bottom of the wall at the edge of the wall along a perimeter of the wall except adjacent the wall opening.

8. The pad painter system according to claim 1, wherein the edge of the wall on lateral sides of the wall is arcuate to cooperate with arcuate arms of the applicator pad to secure the applicator pad to the pad painter, and wherein an outer portion of the lock tab is arcuate to cooperate with applicator pad.

9. A pad painter comprising, in combination:
- an elongated base portion having a wall, a length of the base portion being greater than a width of the base portion;
- a handle portion rearwardly extending in a longitudinal direction from a vertical standing connecting portion of the base portion;
- a lock tab formed at a lateral side edge of the wall of the base portion; and
- a wall opening formed in the wall adjacent to the lock tab so that the lock tab can be resiliently deflected inward toward the wall opening,
- wherein the wall and wall opening extend along the length of the base portion, and
- wherein the wall opening is an elongated opening parallel with the lateral side edge of the wall and inwardly spaced from the lateral side edge of the wall, a length of the elongated opening extending parallel to the longitudinal direction of the handle portion.

10. The pad painter according to claim 9, wherein the pad painter is formed as a one-piece plastic component.

11. The pad painter according to claim 9, wherein the slot is longer than the lock tab.

12. The pad painter according to claim 9, wherein a tab flange downwardly extends from a bottom of the wall and extends inwardly from the edge adjacent each end of the wall opening and around an inward side of the wall opening therebetween.

13. The pad painter according to claim 12, wherein a perimeter flange downwardly extends from a bottom of the wall at the edge of the wall along a perimeter of the wall except adjacent the wall opening.

14. The pad painter according to claim 10, wherein the edge of the wall on lateral sides of the wall and an outer portion of the lock tab are each arcuate.

15. A pad painter comprising, in combination:

an elongated base portion having a wall, a length of the base portion being greater than a width of the base portion;

a handle portion rearwardly extending in a longitudinal direction from a vertical standing connecting portion of the base portion;

a lock tab formed at a lateral side edge of the wall of the base portion;

a tab flange downwardly extends from a bottom of the wall that extends inwardly from the lateral side edge at opposed sides of the lock tab and around an inward side of the lock tab therebetween; and a wall opening formed in the wall adjacent to the lock tab so that the lock tab can be resiliently deflected inward toward the wall opening, wherein the wall and wall opening extend along the length of the base portion, and wherein the wall opening is an elongated opening parallel with the lateral side edge of the wall and inwardly spaced from the side edge of the wall, a length of the elongated opening extending parallel to the longitudinal direction of the handle portion.

16. The pad painter according to claim 15, wherein the pad painter is formed as a one-piece plastic component.

17. The pad painter according to claim 15, further comprising a perimeter flange downwardly extending from a bottom of the wall at the edge of the wall along a perimeter of the wall along a perimeter of the wall except adjacent to the lock tab between ends of the tab flange around the lock tab.

18. The pad painter according to claim 15, wherein the edge of the wall on lateral sides of the wall and an outer portion of the lock tab are each arcuate.

* * * * *